United States Patent [19]

Ishikawa et al.

[11] Patent Number: 5,046,162

[45] Date of Patent: Sep. 3, 1991

[54] IMAGE INPUT DEVICE HAVING COLOR FILTERS AND FILTER POSITION DETECTOR

[75] Inventors: Yujiro Ishikawa, Toyata; Makoto Suzuki, Nagoya, both of Japan

[73] Assignee: Brother Kogyo Kabushiki Kaisha, Nagoya, Japan

[21] Appl. No.: 401,122

[22] Filed: Aug. 31, 1989

[30] Foreign Application Priority Data

Aug. 31, 1988 [JP] Japan .................................. 63-217490
Oct. 31, 1988 [JP] Japan .......................... 63-143894[U]
Oct. 31, 1988 [JP] Japan .................................. 63-274773
Nov. 14, 1988 [JP] Japan .................................. 63-287212

[51] Int. Cl.$^5$ ............................................ H04N 9/04
[52] U.S. Cl. ........................................ 358/42; 358/41
[58] Field of Search ................. 358/41, 42, 43, 44, 358/55, 58, 75; 340/686

[56] References Cited

U.S. PATENT DOCUMENTS

| | | | |
|---|---|---|---|
| 4,587,564 | 5/1986 | Dischert | 358/42 |
| 4,621,284 | 11/1986 | Nishioka et al. | 358/98 |
| 4,831,436 | 5/1989 | Birgmeir et al. | 358/75 |
| 4,887,153 | 12/1989 | Mehara et al. | 357/42 |
| 4,926,247 | 5/1990 | Nagasaki et al. | 358/41 |

*Primary Examiner*—James J. Groody
*Assistant Examiner*—Kim Yen Vu
*Attorney, Agent, or Firm*—Oliff & Berridge

[57] ABSTRACT

An image input device for inputting a light image of an object with the use of a filter unit having at least two color filters for receiving the light image and separating the light image into the color light components corresponding to the color filter elements. The light image passed through the filter is applied to a charge coupled device for converting the light image to an electrical signal. In order to increase the speed for reading the image of the object, according to one aspect of the invention, there is provided an image input device which includes a Hall IC for detecting a position of each of the color filter elements and outputting a position signal representative of the position of each of the color filter elements, a driver for rotating the filter unit so that the color filter elements selectively receive the light image, phase comparator for comparing the phase of the position signal with that of a vertical sync signal and outputting a comparison signal, and a controller responsive to the comparison signal for controlling the filter driver so that the position signal and the vertical sync signal are in synchronism with each other.

6 Claims, 13 Drawing Sheets

CCD CONTROL SIGNAL (INTEGRATION START/STOP)

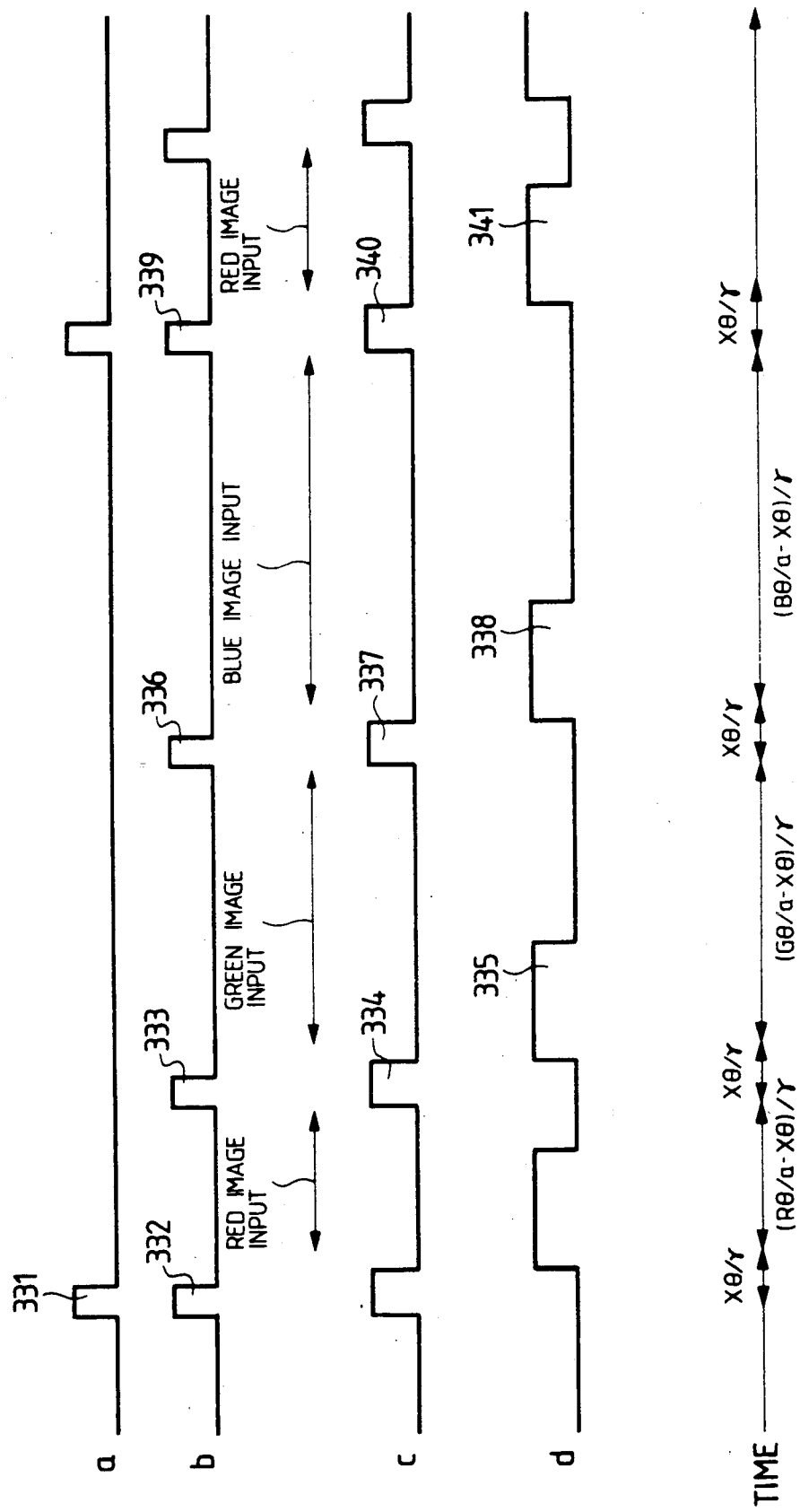

IMAGE INPUT DEVICE HAVING COLOR FILTERS AND FILTER POSITION DETECTOR

BACKGROUND OF THE INVENTION

The present invention relates to an image input device using color resolution filters.

One of the conventional image input devices includes a solid-state image pickup device comprised of charge coupled devices (CCDs) and a rotatable disk-shaped color resolution filter interposed between an object and the image pickup device, in which the light bearing the image of the object is passed through the color resolution filter thereby extracting a light having a particular wavelength. The resultant light is focused on the image pickup device.

FIG. 1 shows an image input device of the type described above. In FIG. 1, the image input device 50 includes a focusing lens 51 attached to the front surface of the device 50, through which a light bearing the image of an object 52 is entered. An image pickup device (hereinafter referred to as "CCD") 53 is disposed in a position on which the light passed through the focusing lens 51 is focused. A disk-shaped rotatable filter unit 54 is interposed between the lens 51 and the CCD 53. As shown in FIG. 4A, the disk-shaped filter unit 54 includes red filter element 55R, green filter element 55G, blue filter element 55B and a transparent filter element 56. These filter elements are circular in shape, of the same size, and are angularly displaced at right angles from one another as shown. The filter unit 54 is rotatable about a center shaft 54C extending perpendicular to, the filter surface for selectively disposing the filter elements on a light path between the lens 51 and the CCD 53. A stepper motor 57 is coupled to the shaft 54C for intermittently rotating the filter unit 54.

An analog-to-digital (A/D) converter 58 is connected to the output of the CCD 53 for subjecting the output signal from the CCD 53 to analog-to-digital conversion, and the output of the A/D converter 58 is in turn connected to a memory 59. The image input device 50 further includes a control unit 60 for controlling the operation of the stepper motor 57, the CCD 53 and the memory 59.

In the image input device arranged as above, brightness control and focal length adjustment are initially performed under the condition where the transparent filter element 56 is disposed on the light path. The stepper motor 57 is then rotated to retract the transparent filter element 56 and position the red filter element 55R on the light path, so that only the red light component is focused on the CCD 53. The CCD 53 receives the light for a predetermined period of time under the aegis of the control unit 63 and outputs data representative of a brightness-integrated value. The data is applied to the A/D converter 58 for analog-to-digital conversion, and the resultant digital data is stored in the memory 59.

The filter unit 50 is then rotated 90 degrees to place the green filter element 55G on the light path, and the green light component is extracted and stored in the memory 59. In the same fashion, the blue filter element 55B is subsequently placed on the light path attendant to the rotation of the stepper motor and the blue light component is extracted and stored in the memory 59.

FIG. 2 shows another example of a conventional image input device. In this device, a focusing lens 51 and a CCD 53 are disposed exactly in the same manner as those shown in FIG. 1. However, the arrangement of a filter unit 156 is slightly different from that shown in FIG. 4A in that as shown in FIG. 4B, the filter unit 156 is angularly equidivided into three segments to provide red color filter element 156R, green color element 156G and blue color element 156B. A DC motor 157 is coupled to the shaft 156a of the filter unit 156 and the disk-shaped filter is rotated by the DC motor 157.

To the rotation shaft of the DC motor 157, an encoder 159 is connected. The encoder 159 has a number if slits arranged to be movably disposed within a gap between an interrupter 160. The interrupter 160 produces pulse trains in accordance with the rotations of the encoder 159. The combination of the encoder 159 and the interrupter 160 has been adjusted to produce n-number pulses (n being multiples of 3 (three)) per one rotation of the rotation shaft of the DC motor 157. Hereinafter, the pulse trains produced from the interrupter 160 will be referred to as a position signal.

An image receiver 154 is connected to the output of the CCD 53 and a sync separator 164 is in turn connected to the output of the image receiver 154. The sync separator 164 separates sync signals from a video signal outputted from the image receiver 154 and the outputs the sync signals. A multiplier 163 is connected to the output of the sync separator 164. The multiplier 163 changes the synchronization of the sync signal to nine n-th (9/n). The multiplier 163 is comprised of a phase-locked loop (PLL) circuit as shown in FIG. 3.

Referring to FIG. 3, the PLL circuit include a phase comparator 163a, a low-pass filter 163b, a voltage controlled oscillator (VCO) 163c, and a frequency divider 163d. The phase comparator 163a has two input terminals, to one of which the sync signal is applied. The pulse trains produced from the VCO 163c are frequency divided into nine n-th (9/n) and the resultant pulses are applied to the other input of the phase comparator 163a. The phase comparator 163 outputs a signal having a phase difference between the two input signals. To the output of the phase comparator 163a, the LPF 163b is connected which has an integration characteristic. The output of the LPF 163b is applied to the VCO 163 as a control voltage. The PLL circuit shown in FIG. 3 controls the sync signal so that the phase difference between the sync signal and the pulse trains produced from the VCO 163c is zeroed, with the result that the pulse trains produced from the VCO 163c becomes equal to the sync signal multiplied by n ninth (n/9).

Referring back to FIG. 2, the thus multiplied sync signal is applied to one input of a phase comparator 162. The position signal is applied to the other input of the phase comparator 162. The phase comparator 162 produces a signal corresponding to a phase difference between these two input signals. A low-pass filter (LPF) 161 is connected to the output of the phase comparator 162. The LPF 161 is provided with an intergration characteristic. To the output of the LPF 161, a driver 158 is connected for driving the DC motor 157 according to pulse width modulation. The driver 158 drives the DC motor 157 in accordance with the output from the LPF 161.

In the above-described circuit shown in FIG. 2, a phase locked loop is provided in which the DC motor 157 serves as a voltage controlled oscillator. The DC motor 157 rotates the filter unit 156 one revolution during a period of time corresponding to 9 periods of the sync signals. That is, during a period of time in which one color filter traverses the optical path extending from the object 52 to the CCD 53, it takes a time corresponding to three periods of the sync signal. During the middle period of the three periods, data integrated in the CCD 53 is taken out to thereby provide corresponding color image.

Although two conventional image input devices have been described, these devices are involved with the following inconvenience or drawbacks. In both the image input devices shown in FIGS. 1 and 2, it is necessary that the filter unit be rotated to place the filter elements in seriatim on the optical path. Therefore, it takes considerable time to input the image. Further, in the device empolying the stepper motor for rotating the filter unit, unwanted vibrations are created. In the device shown in FIG. 2, a phase-locked loop is incorporated in another phase-locked loop, so that arrangement and adjustment of the circuit are complicated and the device becomes costly.

In order to shorten the period of time for picking the image up, the photosensitive elements 53a of the CCD 53 may be covered with red, green and blue filters 53R, 53G and 53B as shown in FIG. 5, thereby dispensing with the filter unit. However, the resolution becomes degraded to about one third.

SUMMARY OF THE INVENTION

In light of the foregoing, it is an object of the invention to provide an image input device in which the vibrations of the device can be greatly suppressed.

Another object of the invention is to provide an image input device in which a period of time for picking the image up can be shortened by a sufficient amount without degrading the resolution of the image.

Still another object of the invention is to provide an image input device which can be manufactured at low cost with a high level of performance.

In order to achieve the above and other objects, there is provided an image input device for inputting a light image of an object, which comprises filter means comprising at least two color filter elements for receiving the light image and separating the light image into the color light components corresponding to the color filter elements, the filter means being movably disposed with respect to the image pickup means, image pickup means having a photosensitive portion for separately receiving the light components and converting the light component to an electrical signal, filter position detecting means for detecting a position of each of the color filter elements and outputting a position signal representative of the position of each of the color filter elements, filter drive means for moving the filter means so that the color filter elements selectively receive the light image, comparison means for comparing the position signal with a reference signal and outputting a comparison signal, and control means responsive to the comparison signal for controlling the filter drive means so that the position signal and the reference signal are in synchronism with each other.

According to another aspect of the invention, there is provided an image input device for inputting a light image of an object, comprising filter means comprising at least two color filter elements for receiving the light image and separating the light image into the color light components corresponding to the color filter elements, the filter means being movably disposed with respect to the image pickup means, image pickup means having a photosensitive portion for separately receiving the light components and converting the light component to an electrical signal including a first sync signal having a first phase, filter position detecting means for detecting a position of each of the color filter elements and outputting a position signal representative of the position of each of the color filter elements, the position signal having a second phase corresponding to the movement of the filter means, filter drive means for moving the filter means so that the color filter elements selectively receive the light image, comparison means for comparing the position signal with a reference signal and outputting a comparison signal, and sync signal generating means for generating a second sync signal, receiving means for receiving the electrical signal in response to the second sync signal, and timing adjusting means for controlling the sync signal generating means to adjust occurrence of the second sync signal in response to a difference betweeen the first and second phases.

According to still another object of the invention, there is provided a color image input device for separating a light image into at least two color light images and converting the color light images into electrical signals, the device comprising a filter unit provided with at least two filters having colors different from each another, each of the filters providing transmission loss different from each another to the light image, and image inputting means for receiving the at least two color light images from the filter unit and for converting the at least two color light images into electrical signals, each of the filters having selected area, which is determined to compensate for the transmission loss inherent to the filters.

The above and other objects, features and advantages of the present invention will become more apparent from the following description when taken in conjunction with the accompanying drawings in which preferred embodiments of the present invention are shown by way of illustartive examples.

BRIEF DESCRIPTION OF THE DRAWINGS

FIG. 21 is a timing chart for description of the operation of the circuit shown in FIG. 18.

DETAILED DESCRIPTION OF THE PREFERRED EMBODIMENTS

In the following description, the expression "front" and "rear" are used to define the various parts when the image input device is disposed in an orientation in which it is intended to be used.

Figure 1:
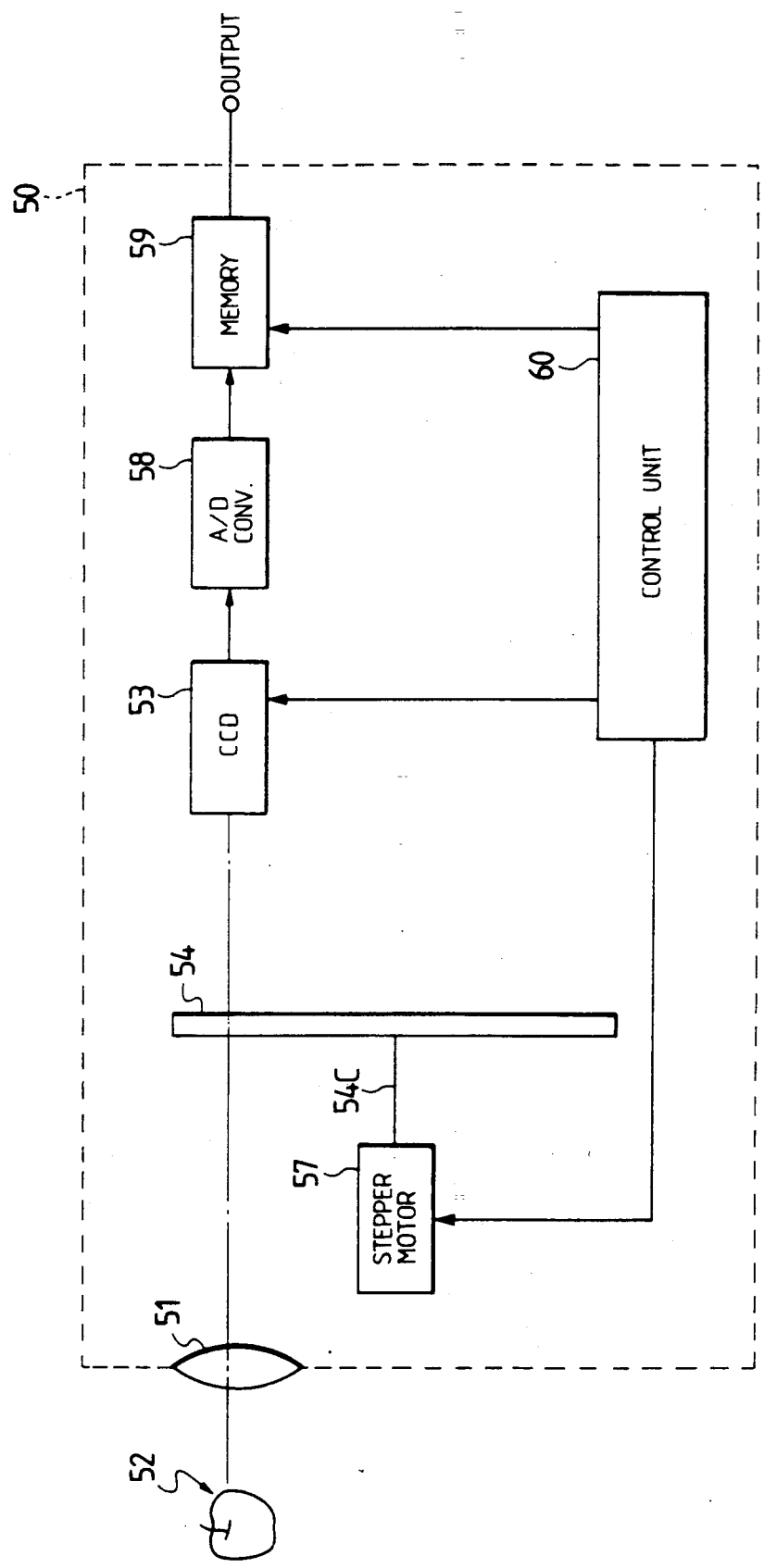
FIG. 1 is a block diagram showing a conventional image input device.
Figure 2:
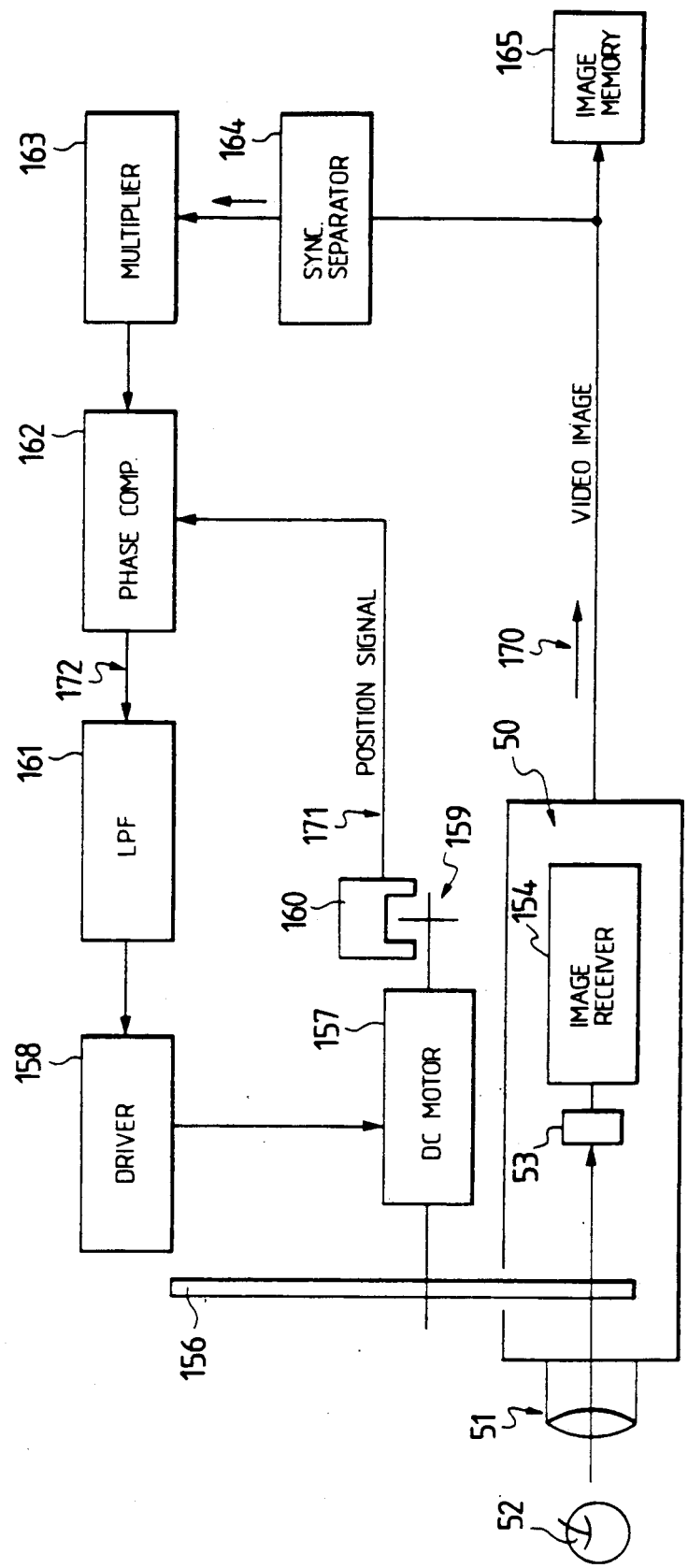
FIG. 2 is a block diagram showing another conventional image input device.
Figure 3:
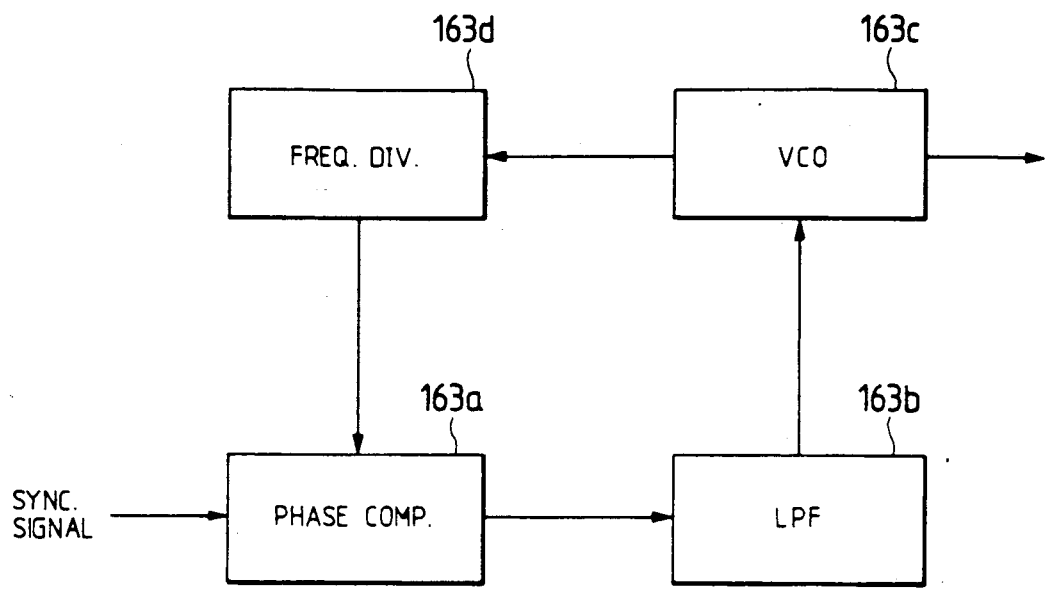
FIG. 3 is a block diagram showing a multiplier incorporated in the circuit shown in FIG. 2.
Figure 5:
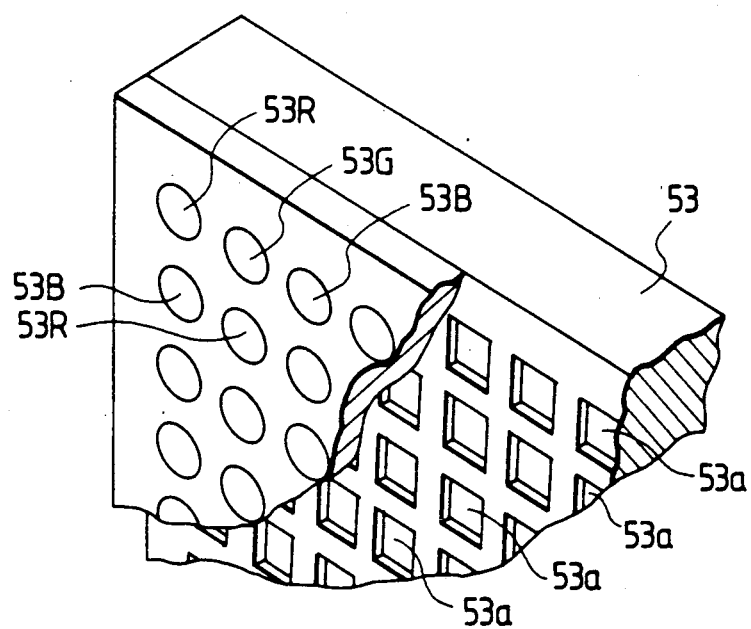
FIG. 5 is a perspective view partially showing another filter unit for use in the image input device shown in FIG. 1.
Figure 4A:
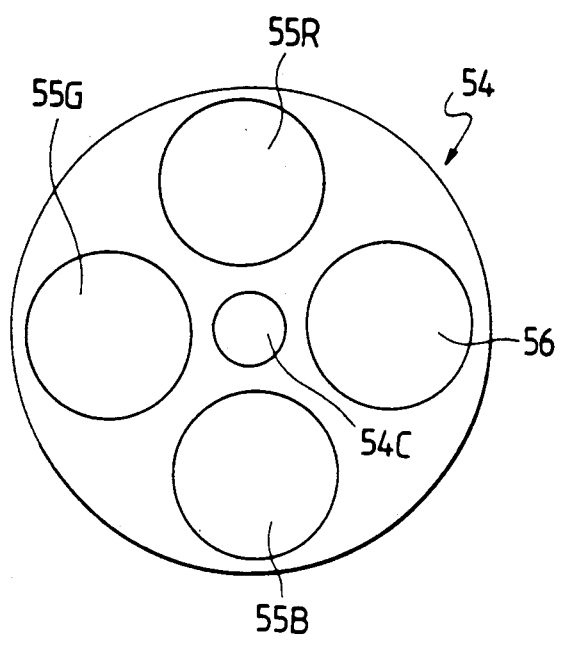
FIGS. 4A and 4B are plan views showing filter units for use in the image input devices shown in FIGS. 1 and 2, respectively.
Figure 4B:
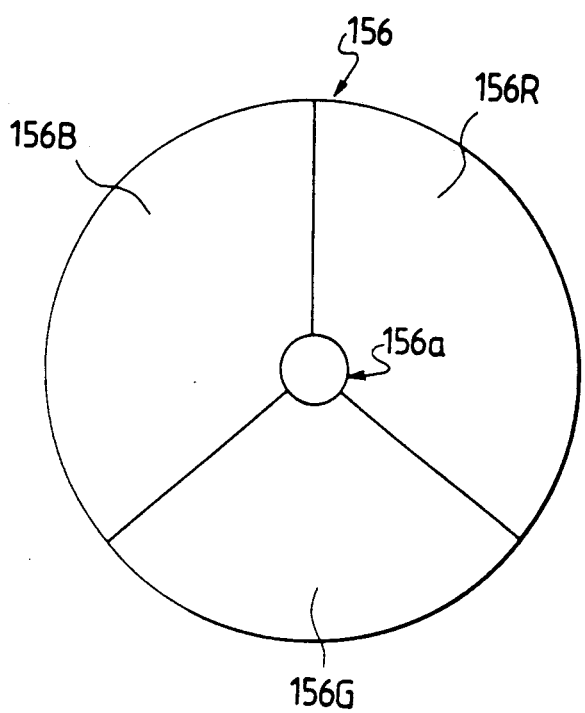
Figure 7:
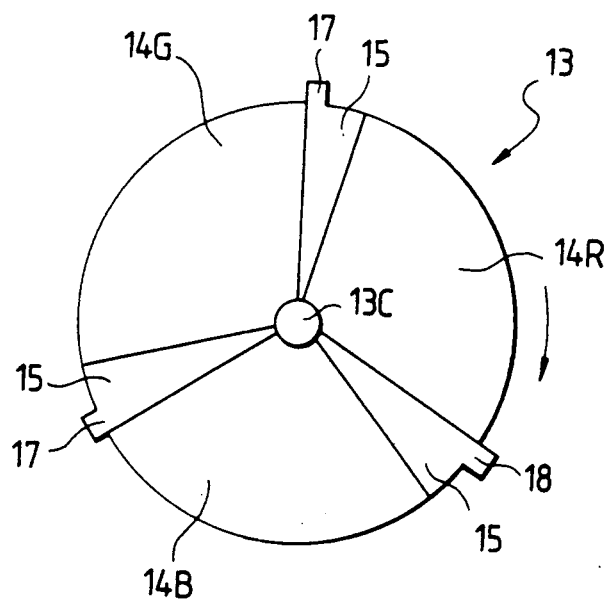
FIG. 7 is a plan view showing a filter unit for use in the device shown in FIG. 6.

An image input device according to a first embodiment of the present will be described with reference to FIG. 6. A lens system 11 is attached frontwardly of the device and a CCD 12 is disposed rearwardly of the lens system 11. The lens system 11 is composed of a plurality of lenses arranged in spaced apart relation from one another. By adjusting the positional relationship between the lenses, the real image of an object 52 disposed remote from the lens system 11 can be focused on the CCD 12. A filter unit 13 is interposed between the lens system 11 and the CCD 12. The filter unit 13 is substantially disk-shaped as shown in FIG. 7 having thereon a red filter element 14R, a green filter element 14G and a blue filter element 14B. These filter element have the same size and are distinctly arranged with a certain spacing between adjacent two filter elements. A light shielding element 15 is interposed between the adjacent two filter elements. The filter unit 13 is rotatable about its rotation shaft 13C, and the filter elements 14R, 14G, 14B and the light shielding elements 15 are selectively disposed on the light path in accordance with the rotations of the filter unit 13. The rotation shaft 13C of the filter unit 13 is coupled to the output shaft of a DC motor 16.

The light path extends from the object 52 to the CCD 12 through the lens system 11 and is surrounded by a black light-shielding wall to prevent the leakage of light. The disk-shaped filter 13 is disposed to traverse the light beam coming from the lens system 11. Each of the filter elements 14R, 14G, 14B and the light shielding elements 15 has a light passing area larger than the cross-sectional area of the light beam. As shown in FIG. 7, each of the light shielding elements 15 has a projection 17 or 18 which is made of a magnet for detecting a rotational angle of the filter. The projection 18 provided between the red filter element 14R and the blue filter element 14B is longer in the radial direction than the remaining two projections 17. The longer projection or magnet 18 serves to detect an origin of the disk-shaped filter.

Referring back to FIG. 6, a Hall integrated circuit (IC) 19 composed of Hall elements is disposed immediately below the filter 13 so that the magnets 17, 18 pass through the gap formed in the Hall IC 19. Whenever one of the magnets 17, 18 passes through the Hall IC 19, a pulse is produced therefrom. A pulse train produced from the Hall IC 19 will be referred to as an angle signal. On the other hand, whenever the longer magnet 18 passed through the Hall IC 19, a pulse is also produced from another terminal of the Hall IC 19. This pulse will be referred to as an origin signal.

The Hall IC 19 is connected to both a phase comparator 21 and a controller 40. The angle signal is applied to one input terminal of the phase comparator 21. To another input terminal of the phase comparator 21, vertical sync signals are inputted. The phase comparator 21 compares the phases of the vertical sync signal and the angle signal from the rising edges of these two input signals, and outputs a positive or a negative voltage corresponding to the phase difference. The output terminal of the phase comparator 21 is connected to a low-pass filter 22 imposing an integration characteristic. The low-pass filter 22 integrates the voltage outputted from the phase comparator 21 and performs smoothing of the waveform. A pulse width modulator 23 is connected to the output of the low-pass filter 22 for subjecting the voltage outputted from a power supply 24 to pulse width modulation in accordance with the ouput voltage from the low-pass filter 22. The output from the pulse with modulator 23 is supplied to the DC motor 16.

The CCD 12 is connected through a variable gain amplifier 31 and an analog-to-digital (A/D) converter 32 to a memory 33. A controller 40 is provided for controlling the CCD 12, the amplifier 31, the A/D converter 32 and the memory 33.

Operation of the device thus arranged will next be described. Rotational control of the filter unit 13 will be described first.

Figure 8:
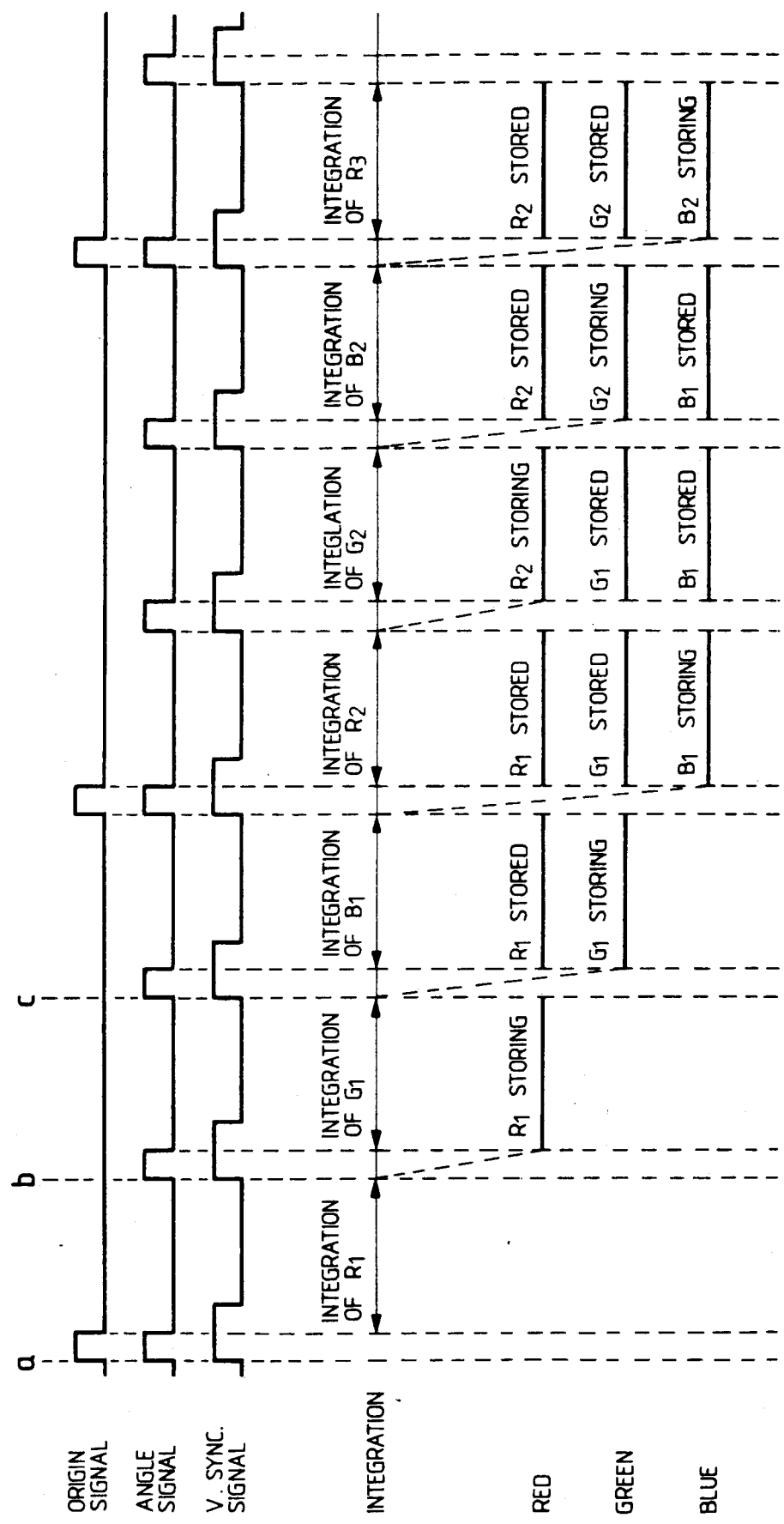
FIG. 8 is a timing chart for description of the operation of the circuit shown in FIG. 6.

The DC motor 16 rotates when powered by the power supply 24. In accordance with the rotations of the rotation shaft 13C of the motor 116, the filter unit 13 is rotated. Then, every time when the magnets 17, 18 pass through the Hall IC 19, the angle signal and the origin signal are produced from the Hall IC 19. The angle signal is applied to one input terminal of the phase comparator 21 which compares the phase of the applied angle signal with that of the vertical sync signal applied to another input terminal thereof. The waveform of the vertical sync signal is shown in FIG. 8. Upon comparison of the two signals, the phase comparator 21 outputs a voltage corresponding to the phase difference. The greater the phase difference of the two input signals and the greater the frequency difference of the two input signals, the greater the absolute value of the output voltage from the phase comparator 21. The polarity of the output voltage of the phase comparator 21 is positive in the case where the phase of the pulse trains from the Hall IC 19 is delayed from that of the vertical sync signal, or the frequency of the pulse trains from the Hall IC 19 is lower than that of the vertical sync signal. The polarity of the output voltage of the phase comparator 21 is reversed in the case where the phase of the vertical sync signal is delayed from that of the pulse trains, or the frequency of the vertical sync signal is lower than that of the pulse trains. The output from the phase comparator 21 is applied to the low-pass filter 22 which transfers the applied signal according to a prescribed transfer characteristic having an integration characteristic. The pulse width modulator 23 carries out pulse width modulation with respect to the current flowed into the DC motor 16 in accordance with the voltage outputted from the low-pass filter 22, thereby varying the duty ratio of the current pulse linearly. Accordingly, if the phase of the pulse trains outputted from the Hall IC 19 is delayed from that of the vertical sync signal, or the frequency of the pulse trains is lower than that of the vertical sync signal, the duty ratio of the current pulse applied to the DC motor 16 becomes higher, and thus the rotational speed of the motor is increased. In the reverse situation, the duty ratio becomes lower and the rotational speed is lowered. As a result, the phase difference between the pulse trains and the vertical sync signal is zeroed. Accordingly, the filter unit 13 rotates at an equi-rotational-speed at a rate of one revolution per three vertical sync signals. It should be noted that at the time of occurrence of the vertical sync signal, the light shielding element of the filter unit 13 is positioned on the light path. In this manner, the filter elements 14R, 14G, 14B traverse in seriatim the light path as the filter unit 13 rotates. Hence, the images of the corresponding colors are focused on the CCD 12.

The controller 40 is supplied with the origin signal fed from the Hall IC 19, and commands the CCD 12 to read the image in timed relation with the rising edge of the origin signal (see time instant a in FIG. 8). At the rising edge of the angle signal (which occurs concurrently with the rising of the origin signal), the controller 40 resets a brightness-integrated value which has been in the photosensitive portions of the CCD 12. As the filter unit 13 rotates, the red filter element 14R is positioned on the optical path. The CCD 12 receives the optical image R1 through the red filter element 14R. The photosensitive portions of the CCD 12 integrates the brightness as received. During a period of time when the light shielding element 15 interrupts the optical path, no light is received in the CCD 12. That is, an integration period is determined depending on the rotational speed of the filter unit 13 and the size of the filter element. Since the rotational speed has been set at constant, it is not necessary in this embodiment to employ a specific circuit for determining the integration time.

Next, when the secondly occuring angle signal raises (see time instant b of FIG. 8), the controller 40 instructs the CCD 12 to tansfer the electrical charges corresponding to the integrated value to a buffer incorporated in the CCD 12. Then, the integrated value is reset, an the CCD 12 is placed in a ready condition for reading the subsequent green optical image G1. As the filter unit 13 further rotates, the green filter element 14G is positioned on the optical path, and the reading of the green image G1 is commenced. Simultaneously, the electrical charges (indicative of the integrated value) transferred to the buffer is sequentially outputted in timed relation with a timing signal outputted from the controller 40. A voltage corresponding to the outputted charges is amplified by the variable gain amplifier 31 and the amplified voltage is subjected to analog-to-digital conversion with the A/D converter 32. Thereafter, the resultant digital signal is stored in the memory 33. At this time, the variable gain amplifier 31 is controlled by the controller 40 so as to amplify the signal with an amplification factor corresponding to the color of the optical image so that the difference in transmittance of the respective filters 14R, 14G, 14B and the characteristics of the CCD with respect to the respective colors are compensated for. Further, the controller 40 controls so that the storage of the red optical image R1 may be completed within a period of time during which the green optical image G1 is read out. When the following angle signal are produced (see time instant c of FIG. 8), the storage of the green optical image G1 and the reading of the blue optical image B1 are carried out. As the filter unit 13 further rotates, reading and storing of the red optical image R2, the green optical image G2 and the blue optical image B2 are carried out in sequence.

In order to output image data with the device of this embodiment, the data stored in the memory 33 is saved at the timing at which the first angle signal is produced immediately after the occurrence of an origin signal, and then the data is outputted according to a prescribed format.

In the case where a monochromatic image data is needed, such data is available by adding the respective color data.

In the above-described embodiment, the sensitivity characteristics of the CCD with respect to the respective colors are compensated for by the variable gain amplifier 31.

With the first embodiment described above, the image can be read out within a short period of time without degrading the resolution of the image. In addition, since the filter unit 13 is not rotated intermittently, the vibration can be suppressed and the control of the device can be simplified.

Figure 9:
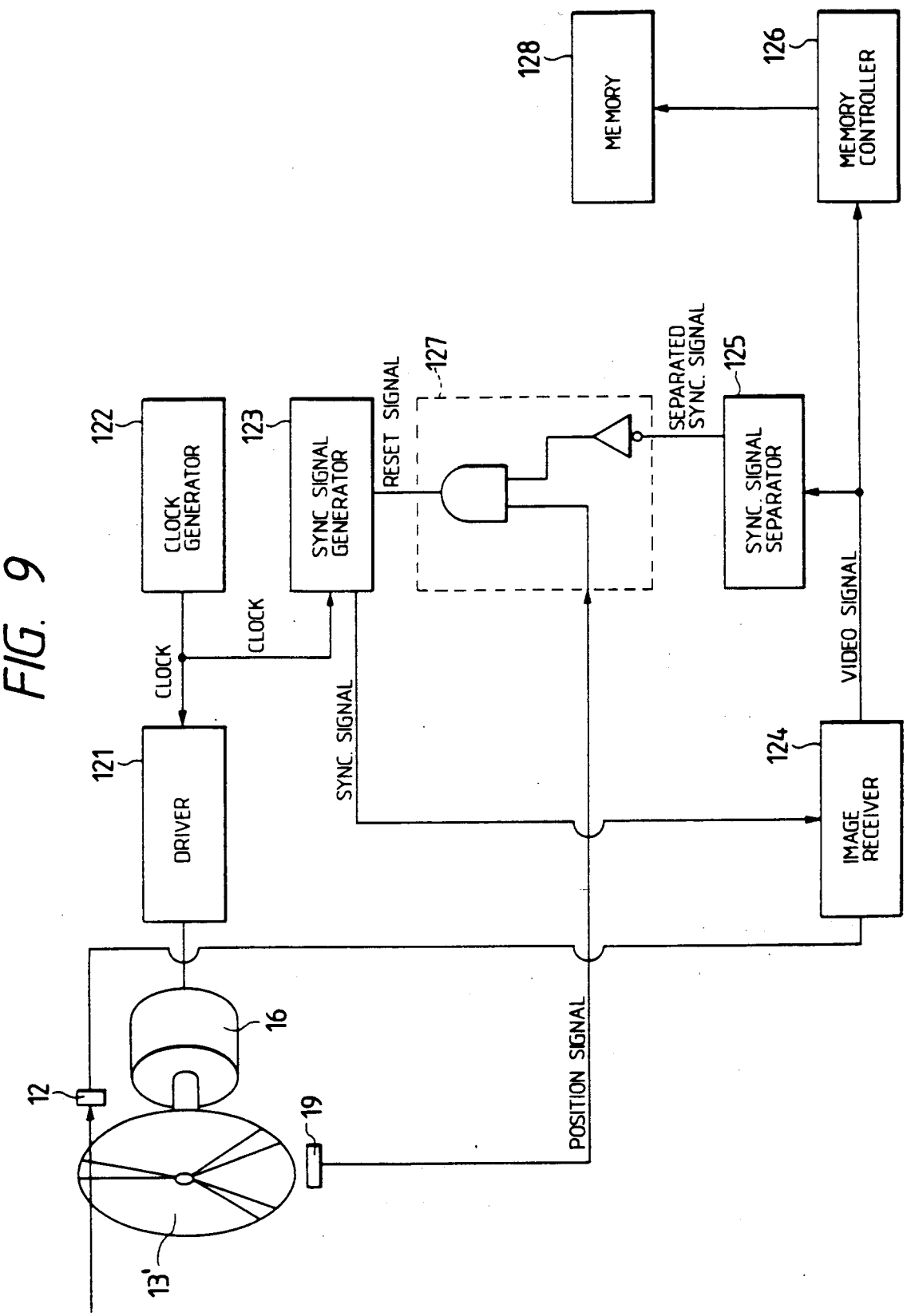
FIG. 9 is a block diagram showing an image input device according to a second embodiment of the present invention.
Figure 10:
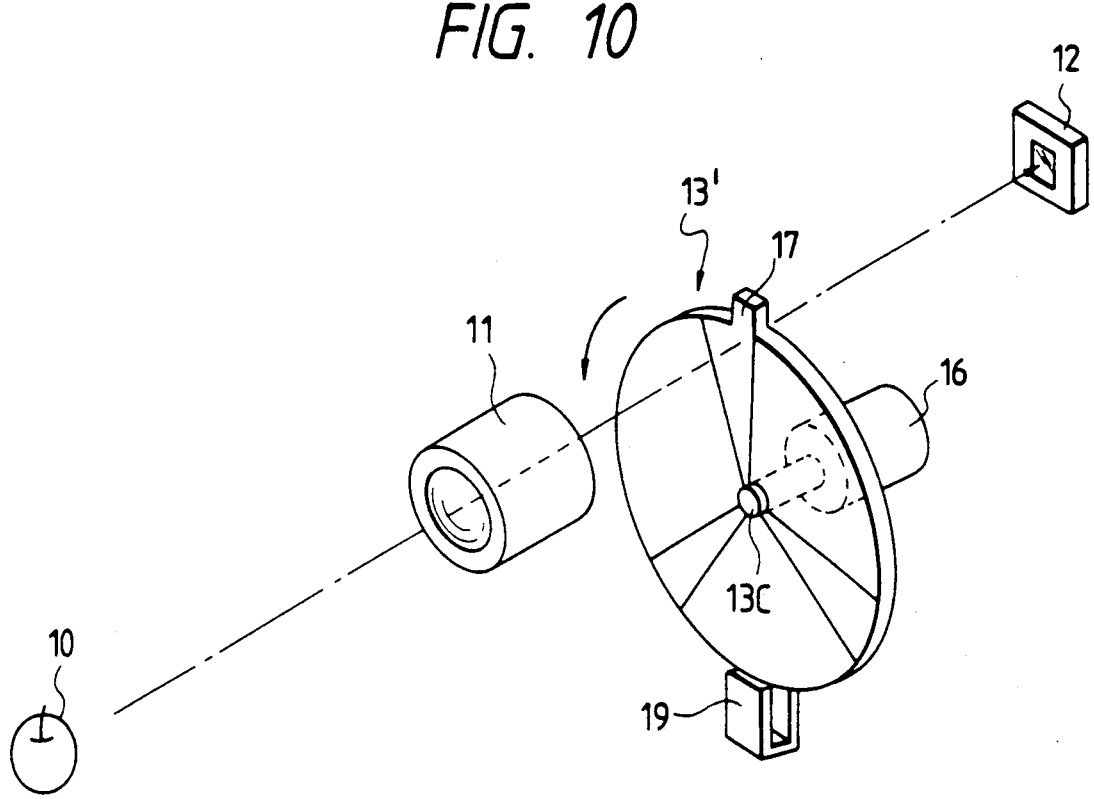
FIG. 10 is a perspective view showing the image input device shown in FIG. 9.
Figure 11:
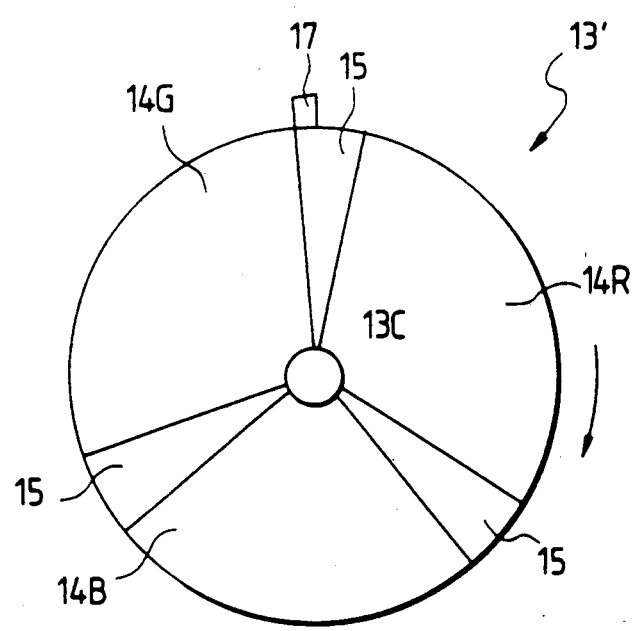
FIG. 11 is a plan view showing a filter unit for use in the device shown in FIG. 9.

FIG. 9 shows another image input device according to the second embodiment of the present invention. An optical system employed in the device of the second embodiment is similar in arrangement to that of the first embodiment but differs therefrom in that only a single magnet 17 is provided for detecting a rotational angle of the filter unit as best shown in FIG. 11. Whenever this magnet passes through a Hall IC 19, a pulse is produced. This pulse will be referred to as a position signal. In FIG. 9, the same reference numerals as those shown in FIG. 6 denote the same or similar components as those shown in FIG. 6, and a duplicate description will be omitted.

As shown in FIG. 9, a stepper motor 16 is coupled to a filter unit 13'. A clock generator 122 generates clocks or pulse trains having a predetermined frequency. To the output terminal of the clock generator 122, a driver 121 and a sync signal generator 123 are connected. The driver 121 serves to frequency divide the clocks and input the frequency-divided clocks to the stepper motor 16 for rotating the latter at a rate of one revolution per 100 miliseconds. On the other hand, the sync signal generator 123 frequency divides the clocks and produces pulse trains having a period of one thirtieth (1/30). The sync signal generator 123 further produces another pulse trains needed for another synchronization. The pulse trains having the period of one-thirtieth thus produced will simply be referred to as sync signals meaning vertical sync signals. The sync signal generator 123 is provided with a reset terminal to which a reset signal is applied for resetting the sync signal generator 123. When the reset signal is generated from a circuit (to be described later) and is applied to the reset terminal of the sync signal generator 123, the latter is reset in response thereto. Immediately thereafter, the sync signal generator 123 produces the sync signal.

An image receiver 124 is connected to the output of the CCD 12. The image receiver 124 receives both the image data read out by the CCD 12 and the sync signals supplied from the sync signal generator 123, and outputs a video signal from its output terminal.

A sync signal separator 125 and a memory controller 126 are connected to the output terminal of the image receiver 124. The sync signal separator 125 receives the video signal and separates the sync signals out of the video signal. The sync signals thus separated are outputted from the output terminal of the sync signal separator 125. The sync signal separated by the sync signal separator 125 will be referred to as separated sync signal for the sake of distinguishing it from the sync signal generated from the sync signal generator 123. The output terminal of the sync signal separator 125 is connected to one input terminal of a sync signal comparator 127, to another intput terminal of which the Hall IC 19 is connected for receiving the position signal. The comparator 127 is composed of a NOT gate and an AND gate for inverting the separated sync signal with the NOT gate and ANDing the inverted separated sync signal and the position signal. The output from the comparator 127 is the reset signal applied to the reset terminal of the sync signal generator 123.

A memory controller 126 is connected to the output of the image receiver 124 for storing the video signal in a memory 128 in response to the sync signal. A terminal allowing for directly feeding the video signal out of the image input device may be provided, if desired.

In the image input device arranged as described, the clock generator 122 generates clocks having a predetermined frequency and the driver 121 frequency divides the clocks to produce a drive signal to be applied to the stepper motor 16. In response to the drive signal, the stepper motor 16 rotates the filter unit 13' at a rate of one revolution per 100 miliseconds.

In this manner, the filter unit 131 is rotated, and the color filter elements 14R, 14G, 14B are successively moved to traverse the optical path. Thus, the images corresponding to the respective colors are focused on the CCD 12. On the other hand, the sync signal generator 123 frequency divides the clocks generated from the clock generator 122 and produces the sync signals having a period of one thirtieth (1/30) second. The sync signal has been adjusted in advance so that its rising edge coincides with the rising edge of the position signal.

The image receiver 124 reads the image data from the CCD 12 whenever the respective color filters traverse the optical path in accordance with the rotations of the filter unit 13', and produces a one-frame video signal corresponding to a single color. The memory controller 126 receives the video signal and discriminates color signals of the respective frames based on the sync signals contained in the video signal and the position signal fed through a signal line (not shown). This image data is translated to color information for each pixel and the resultant data is stored in the relevant storage location of the memory 128.

Figure 12:
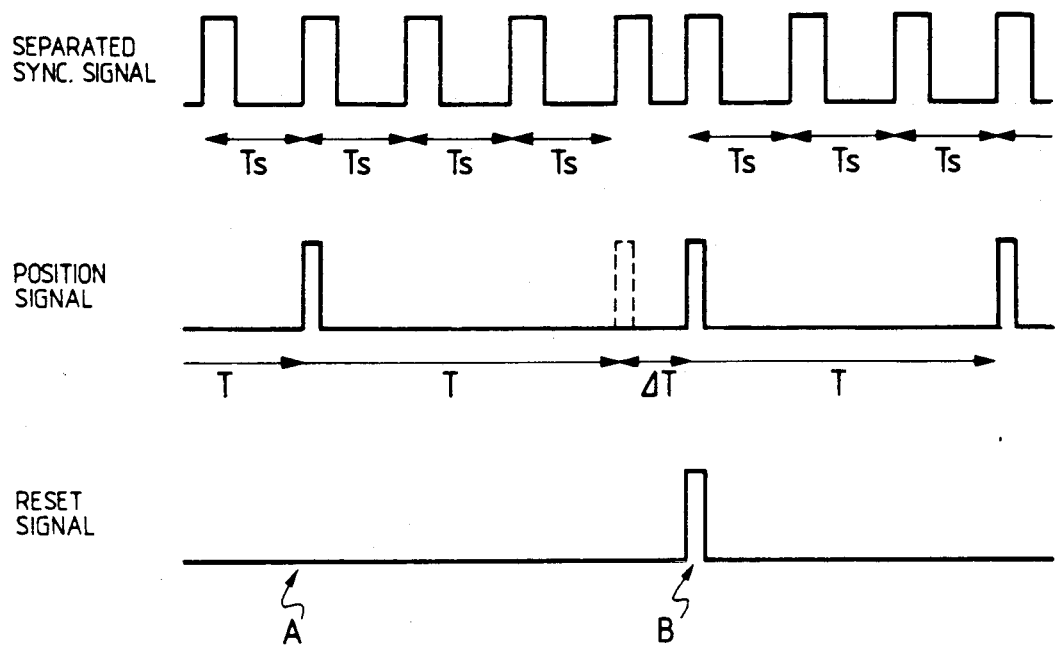
FIG. 12 is a timing chart for description of the operation of the circuit shown in FIG. 9.
Figure 13:
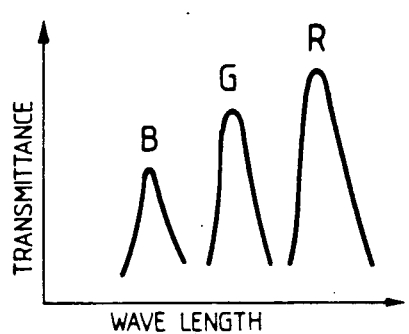
FIG. 13 is a graphical representation showing a relation between a wavelength and a transmittance of the filter unit shown in FIG. 4B.

The sync separator 125 receives a part of the video signal and separates the sync signal out of the video signal. The separated sync signal is applied to one input terminal of the comparator 127. The comparator 127 compares the separated sync signal with the position signal. When the stepper motor 16 is being rotated at an equi-rotational-speed, the separated sync signal and the position signal are concurrently generated (see an arrow A in FIG. 12), thus no reset signal is produced. However, should the stepper motor 16 rotate at an unequi-rotational-speed due to external disturbances or the like, the separated sync signal and the position signal are asynchronized with each other, then the comparator 127 produces the reset signal (see an arrow B in FIG. 12). When the reset signal is produced, the sync signal generator 123 changes the occurrence of the sync signal so that the rising edge of the reset signal coincides with the rising edge of the sync signal as indicated in FIG. 12I. Specifically, in the case where the number of steps that stepper motor 16 advances is displaced due to the external disturbance, the phase of the sync signal is forcibly brought to coincide with the rotation of the stepper motor 16.

The image being read out by the CCD 12 at the time when the reset signal is produced is incomplete. However, complete image can be obtained after the production of the reset signal, since the sync signal and the position signal has been synchronized.

For utilizing the image stored in the memory 128 as a still image, the data may be stored at a desired time if no reset signal has been produced or at a time after the production of the reset signal if the reset signal has been produced.

As described above, according to the device of the second embodiment, complicated processing with the use of phase-locked loop is not necessary. Therefore, the device can be arranged inexpensively. In addition, adjustment of the device can be achieved quite easily. Even if the rotations of the filter unit fluctuate due to the external disturbance, synchronization can be attained instantaneously.

In general, the transmittances of the R, G and B filters to an incident light (passing losses of the incident light to the respective filters) are different from one another. Accordingly, in the above embodiment using the disk-shaped plate having three color filters arranged thereon in such a manner that the filters are equivalently partitioned, there occurs a case where a color component of an incident light image has an insufficient light intensity when a CCD for receiving the incident light image is continuously exposed to the light image through the disk plate rotating at a constant speed. This problem is solved by the following manner. The size or area of each color filter is adjusted in accordance with the transmittance (passing loss) of each of the color filters.

Figure 14:
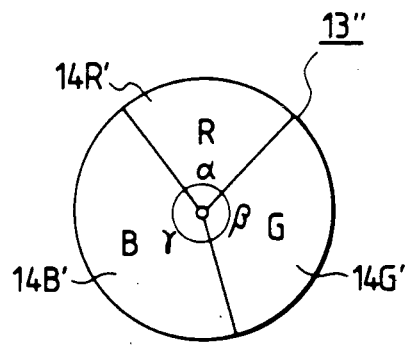
FIG. 14 is a plan view showing a filter according to one embodiment of the present invention.

FIG. 14 shows a modified filter unit used in the color image input device.

The filter unit 13'' as shown in FIG. 14 is of a disc type and the surface thereof is partitioned into three areas which are assigned to red, green and blue filters 14R', and 14G' and 14B', respectively. The size or area of each color filter is not equal to one another, but is dependent on the passing loss of the incident light to each color filter (transmittance of each color filter to the incident light). In this embodiment, each of the color filters has a fan form as shown in FIG. 14 and the partition angles $\alpha$, $\beta$ and $\gamma$ of the color filters 14R', 14G' and 14B' are determined so that the partition angle of the red filter providing a maximum transmission light intensity is smallest and that of the blue filter providing a minimum transmission light intensity is largest. The "size" of the color filter is determined on the basis of the light intensity of the light which has been passed through the rotating color filter to the lens system 202. That is, each color filter is designed so that the product of the size of each color filter and the transmission ratio of the incident light to the color filter (transmittance of the color filter to the incident light) is equal to that for other color filters.

Figure 15:
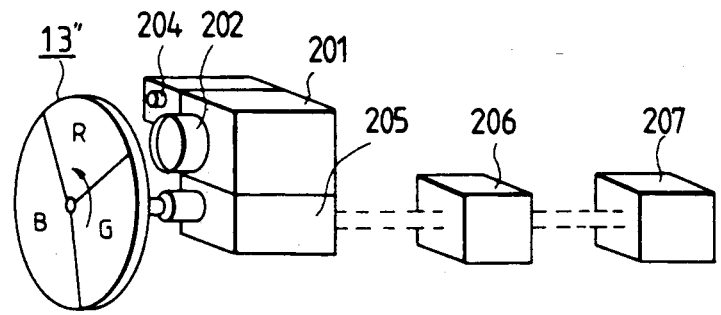
FIG. 15 is a perspective view showing an image input device according to a third embodiment of the present invention empolying the filter shown in FIG. 14.

FIG. 15 shows a third embodiment of the color image input device of this invention, in which the filter unit as shown in FIG. 14 is used.

The color image input device of this embodiment comprises a filter unit 13″ as shown in FIG. 14, an image inputting unit 201 having a lens system 202 at the front side thereof, a motor 205 mounted on the lower side of the image inputting unit 201 for rotating the filter unit 13″, and a color sensor 204 provided at the side of the color image input device and in the neighborhood of the lens system for judging the color of the incident light to the lens system 202, The image inputting unit 201 carries out a scanning operation on the basis of an output signal from the color sensor 204. The output signal from the image inputting unit 201 is applied to signal conversion means 206 to be subjected to amplification, A/D conversion and other signal processings. The output signal from the signal conversion means 206 is memorized in storing means 207 such as a disc type memory or the like.

The operation of the color image input device as shown in FIG. 15 will be described hereinunder.

The filter unit 13″ is rotated at a constant speed by the motor 205, and the red, green and blue components of an incident light image are successively and continuously passed through the red, green and blue filters, respectively, to the lens system 202 in this order during rotation of the filter unit 13″.

Figure 16:
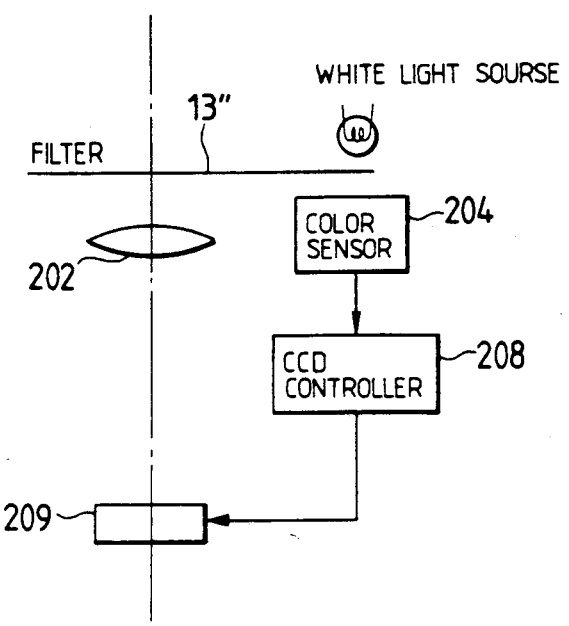
FIG. 16 a block diagram of the image input device shown in FIG. 15.

As shown in FIG. 16, the color sensor 204 detects the color of the incident light to the lens system 202 and outputs a color signal indicating the detected color to a CCD control circuit 208 in the image inputting unit 201.

Figure 17:
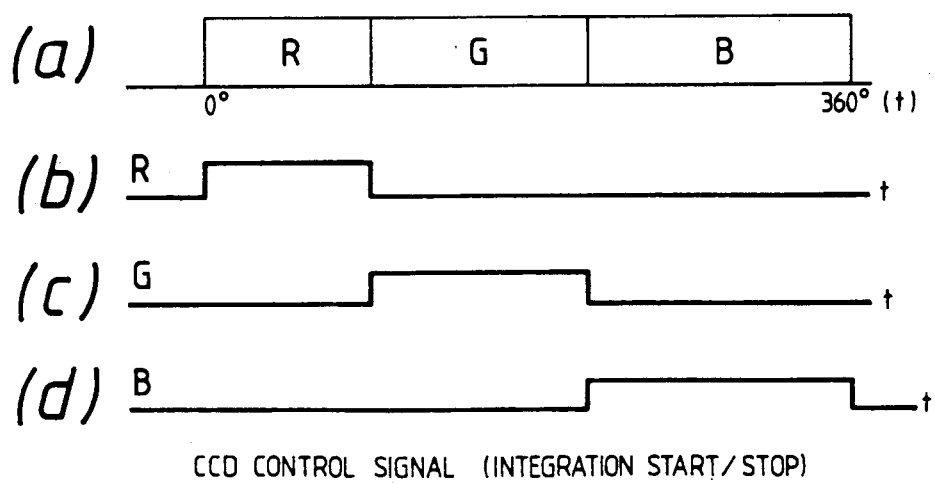
FIG. 17 is a timing chart for description of the operation of the circuit shown in FIG. 16.

In response to input of the color signal, the CCD control circuit 208 recognizes the color of the filter through which the light image is presently passed and outputs a color recognition signal as shown in FIGS. 17(a) to 17(d). For example, when judging the color of the filter to be red, the CCD control circuit 208 outputs a color recognition signal having a pulse width corresponding to the period when the light image is passed through the red filter. The light image on the CCD 209 is scanned by one field with a timing as shown in FIGS. 17(a) to 17(b) in response to the color recognition signal from the CCD control circuit 208, and then converted into an electrical signal.

The time intervals (pulse widths) of the signal recognization signals R, G and B in FIGS. 17(b) to (d) correspond to the partition angles α, β and γ of the color filters 14R′, 14G′ and 14B′, respectively. The electrically-converted signal is applied to the signal conversion means 206 to be subjected to the conversion processings, and then is applied to the storing means 207 to be memorized therein.

When the filter unit 13″ is further rotated and the color sensor 204 detects the green filter 14G′, the CCD control circuit 208 controls the CCD 209 to scan the light image passed through the green color filter by one field. The output signal from the CCD circuit 209 is memorized in the storing means 207 in the same manner as described above.

When the filter unit 13″ is still further rotated and the color sensor 204 detects the blue filter 14B′, the CCD control circuit 208 controls the CCD 209 to scan the light image passed through the blue filter by one field. The output signal from the CCD circuit 209 is memo- rized in the storing means 207 in the same manner as described above.

According to the above process, three color image signals are obtained while the filter unit 13″ is continuously rotated at a constant speed.

In this embodiment, the color filters are designed in a manner such that they are partitioned on a disc plate, however, the arrangement of the color filters of this invention is not limited thereto. For example, the color filters may be arranged parallel with one another on a belt type plate or the like, that is, the filter unit may be in a strip form. In this case, the lateral width of each color filter is adjusted in accordance with the transmission of the color filter.

As described above, it is unnecessary to uniformly provide areas for each of the color filters of the filter unit, but each of the areas areas can be varied freely. Such variable setting in filtering area is advantageous in an image input device which is incapable of freely setting integration time for an incident image due to rotation of the filter unit at a constant speed. That is, in the image input device of this type, it is impossible to freely determine integration time since the filter unit is rotated at a constant speed. Consequently, in case of the employment of CCD whose sensitivity is varied dependent on wavelength of the input light, it is absolutely necessary to provide a variable gain amplifier controlled in synchronism with the rotation of the filter unit. However, with respect to the variable gain amplifier, S/N ratio (signal-to-noise ratio) is reduced for an light having a low sensitivity to the CCD since noise component attendant to the signal is also amplified at the same gain as the signal. Accordingly, remarkable noise component is acknowledged with respect to the blue color component in the actually inputted image.

Figure 6:
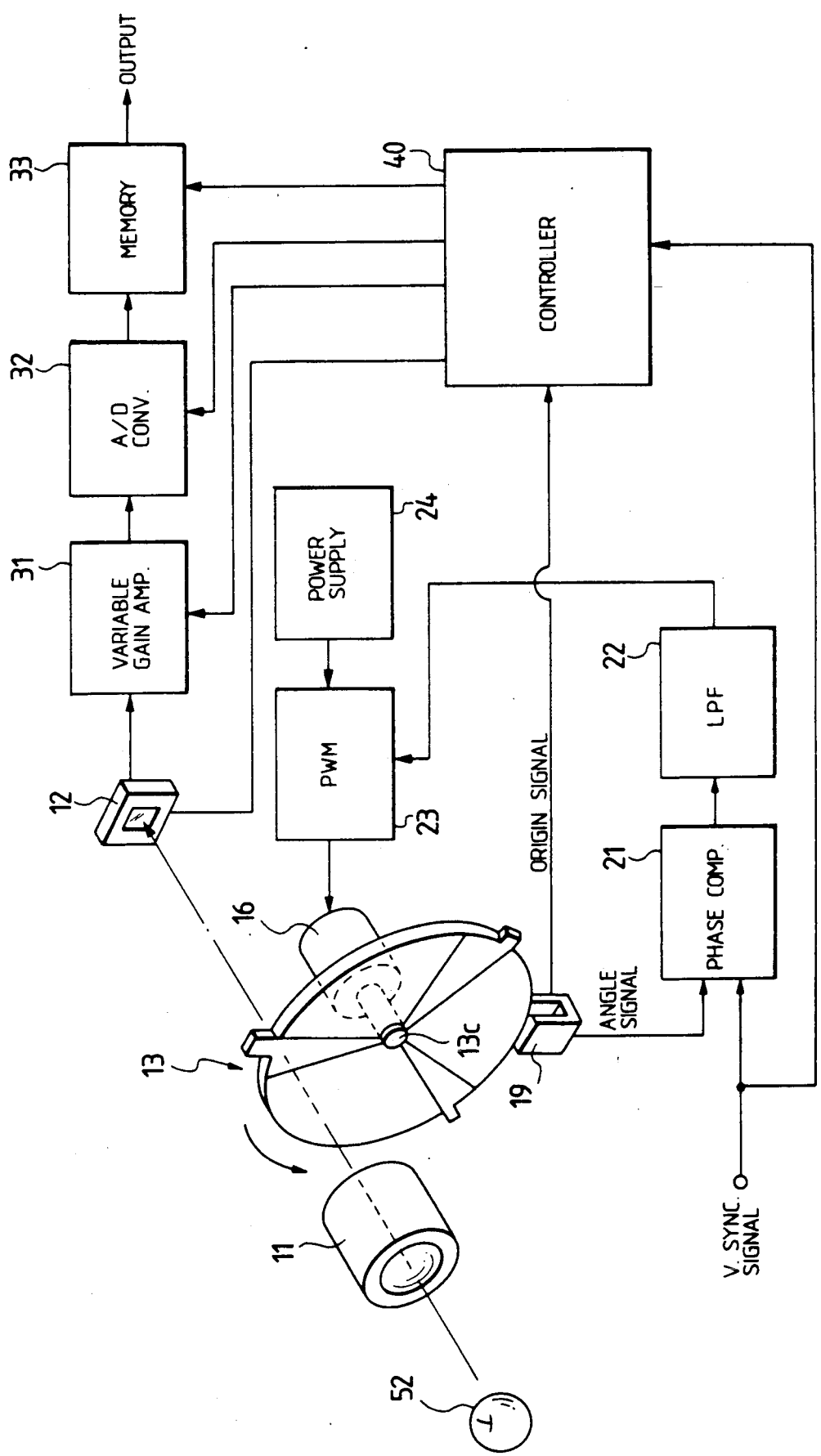
FIG. 6 is a block diagram showing an image input device according to a first embodiment of the present invention.
Figure 18:
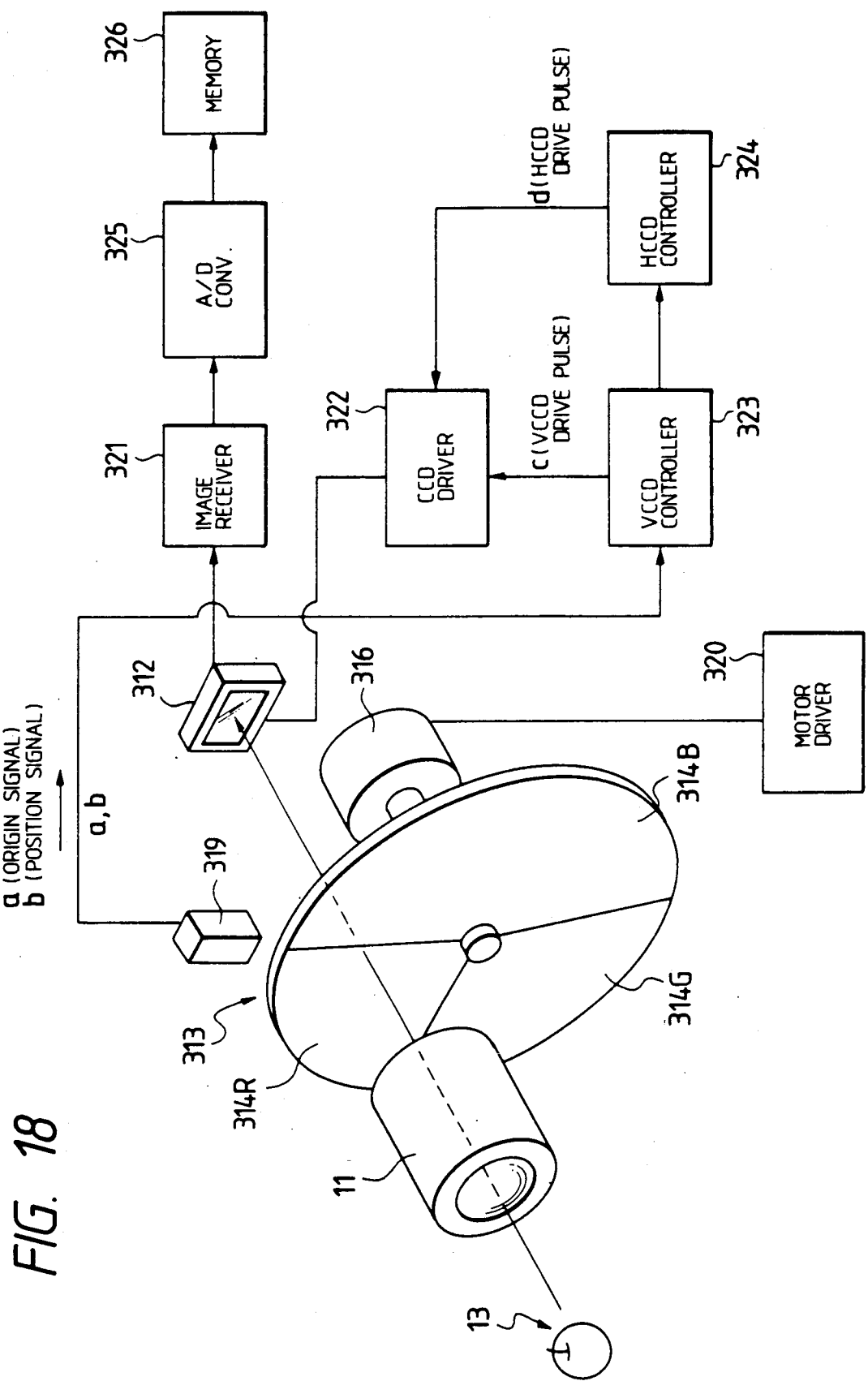
FIG. 18 a block diagram showing an image input device according to a fourth embodiment of the present invention.

FIG. 18 shows an image input device according to a fourth embodiment of the present invention wherein like parts and components are designated by the same reference numerals and characters as those shown in the embodiment of FIG. 6.

A CCD 312 used in the fourth embodiment has a low sensitivity in short wavelength band, but the degraded sensitivity is corrected according to this embodiment.

A filter unit 313 is provided between a lens system 11 and CCD 312. As shown in FIG. 18, the filter unit 313 is a disc shape on which a red filter 314R, a green filter 314G and a blue filter 314b are provided in the circumferential direction thereof. The filter unit 313 is provided rotatable about a rotation shaft 313C extending through a central portion of the unit. In accordance with the rotation of the filter unit, each one of the filters 314R, 314G and 314B can be disposed in the optical path. The rotation shaft 313C is connected to an output shaft of a stepper motor 316.

The partition angles of the fan-formed filters are defined as follows.

Assuming that the total sensitivity ratios of the components such as an optical system and a CCD system to the red, green and blue filters 314R, 314G and 314B are $\eta R$, $\eta G$ and $\eta B$ when each of those filters covers the CCD completely and individually without rotation of the filter unit ($\eta R > \eta G > \eta B$), the partition angles of the R, G and B filters should be selected so that these can be satisfied with the following equation.

$$(R\theta - X\theta)\eta R = (G\theta - X\theta)\eta G$$
$$= (B\theta - X\theta)\eta B$$

Figure 19:
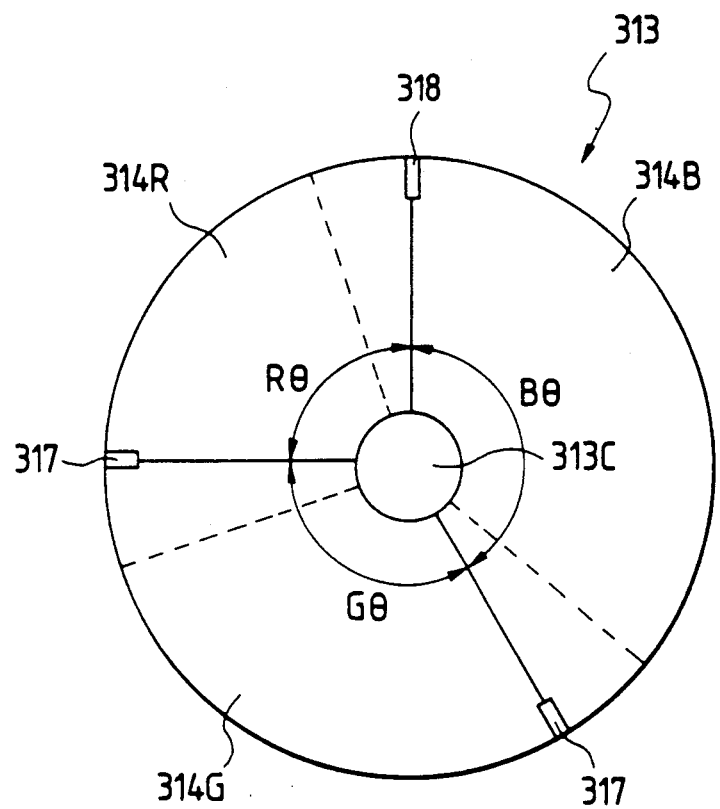
FIG. 19 is a plan view showing a filter for use in the image input device shown in FIG. 18.
Figure 20:
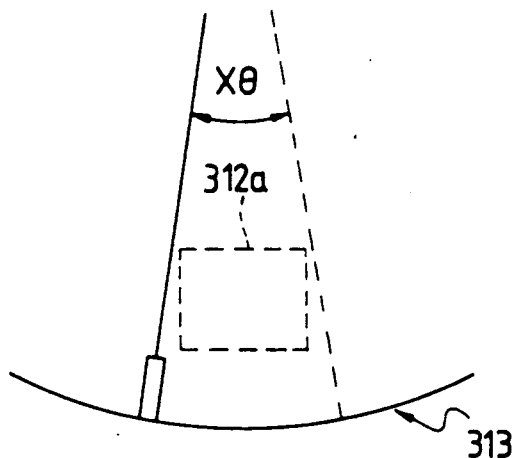
FIG. 20 is a diagram for description of the filter employed in the device shown in FIG. 18.

Here, $R\theta$, $G\theta$ and $B\theta$ designate partition angles of the red, green and blue filters 314R, 314G and 314B, respectively as shown in FIG. 18. $X\theta$ is derived from the partion angle of each color filter since the CCD 312 has a given area as shown in FIG. 19. This angle $X\theta$ is indicative of the angle which defines a given sector area where boundary portion between the neighboring filters passes through the optical path 312a and therefore a complete read-out of the specific color component of the image is impossible.

The optical path is surrounded by a black light shielding wall. These filters 314R, 314G and 314B cover the optical path without any space in cross-sectional standpoint. Further, at the boundary position of the neighboring filters, two magnets 317 and one magnet 318 are provided in the filter unit for detecting the rotation angle, similarly to the filter unit shown in FIG. 7. In the fourth embodiment, the magnets 317 and 318 are provided radially inwardly with respect to the circumferential edge line of the filter unit. However, the position of the magnets 317 and 318 of this invention is not limited thereto. For example, these magnets can be provided radially outwardly relative to the circumferential edge line as shown in FIG. 7.

The stepper motor 316 is provided with a motor drive circuit 320 which controls the stepper motor 316 to rotate at a constant rotation speed. Further, an image receiving circuit 321 and CCD drive circuit 322 are connected to the CCD 312. The CCD 312 supplies an image signal to the image receiving circuit 321 in accordance with the driving operation of the CCD drive circuit 322. The image receiving circuit 321 converts image information represented by the image signal outputted from the CCD 312 into a predetermined format. A VCCD control circuit 323 and a HCCD control circuit 324 are connected to the CCD drive circuit 322. The VCCD control circuit 323 generates VCCD driving pulses whose pulse number corresponds to a time required for transferring to the vertical CCD(VCCD) the charges which have been stored until a position signal is generated. The required time is shorter than the period when the filter boundary passes over the optical path. Further, the HCCD drive circuit 324 generates HCCD driving pulses whose number corresponds to a period required for outputting the charges transferred to the VCCD toward outside of the CCD 312 as an image signal, after the generation of the VCCD driving pulses is terminated. These VCCD driving pulses and HCCD driving pulses are inputted into the CCD 312 through the CCDE drive circuit 322. The period calculated by adding the pulse widths of the VCCD and HCCD driving pulses, that is, the period required for outputting the image signal corresponding to one field is set to be shorter than the period when the color filter having the smallest partition angle, that is, the red filter passes over the optical path. The image receiving circuit 321 is connected to an analog-to-digital converter (A/D converter) 325 for quantizing the input signal from the image receiving circuit 325 with a predetermined sampling frequency which is determined on the basis of the sampling theorem. The signal thus quantized in the A/D converter 325 is applied to a memory 326. Further, a controller (not shown) synthetically controls the above components of the image input device.

The operation of the image input device as shown in FIG. 18 will be described hereinunder.

The stepper motor 316 is driven by the motor drive circuit 320 to rotate the filter unit 313 at a constant rotation speed represented by $\gamma$ (rad/sec). simultaneously with the boundary line of the neighboring color filters intersecting the optical path 312a, a position signal is generated. The CCD remains unactuated by the CCD drive circuit 322 for the period of ($x\theta/\gamma$ second), that is, from the time when a position signal (first position signal) 332 is generated together with an origin signal till the time when the boundary line of the blue and red filters 314B and 314R passes over the optical path 312a. Thereafter, the CCD 312 commences to read out an image thereon. The read-out operation of the CCD 312 continues for a predetermined period (($R\theta-X\theta$)/$\gamma$ sec.) and is terminated when the next position signal (second position signal) 333 is generated. During the read-out operation of the CCD 312, the optical path 312a is completely covered by the red filter 314R.

When the second position signal 333 is generated, the VCCD control circuit 323 generates a VCCD driving pulse 334. In response to input of the VCCD driving pulse 334, the CCD drive circuit 322 controls the CCD 312 to transfer the charges stored in the CCD 312 to the VCCD. Thereafter, the HCCD control circuit 324 generates a HCCD driving pulse 335. In response to the generation of the HCCD driving pulse 335, the CCD driving circuit 322 controls the CCD 312 to successively transfer the charges in the VCCD to the image receiving circuit 321 as a image signal. The image receiving circuit 321 converts the image data represented by the image signal from the VCCD into a predetermined format and outputs to the A/D converter 325. The signal thus formatted is quantized in the A/D converter 325 and is memorized in a memory area for the red component in the memory 326.

On the other hand, a photosensitive portion of the CCD 312 remains unactuated for the period of $x\theta/\gamma$ (sec.) after the second position signal 333 occurs. For this period, the boundary line of the red and green filters 314R and 314G passes over the optical path 312a, and the generation of the VCCD driving pulses 334 is terminated. The CCD 312, after unactuated for the period of $x\theta/\gamma$(sec.), commences or read out the image again. In this case, the optical path 312a is completely covered by the green filter 314G. The read-out operation of the CCD 312 continues for the period of ($G\theta-X\theta$)/$\gamma$ (sec.) and is terminated when the next position signal (third position signal) 336 is generated. At the time when the third position signal occurs, the generation of the HCCD driving pulses has been finished. Upon generation of the third position signal 336, the VCCD control circuit 324 and the HCCD Control circuit 325 successively generate a VCCD driving pulse 337 and a HCCD driving pulse 338 respectively in the same manner as described above.

In synchronism with those signals, the image signal outputted from the CCD 312 is subjected to the same signal processing as described above in the image receiving circuit 321 and the A/D converter 325, and then is memorized in a memory area for the green component in the memory 326.

The photosensitive portion of the CCD 312 remains unactuated for a period of $x\theta/\gamma$ (sec.), and thereafter the CCD begins to read out the image signal in the photosensitive portion thereof.

The read-out operation of the CCD 312 continues for the period of (Bθ−Xθ)/γ (second) and is terminated when the next position signal (fourth signal) 339 is generated. The optical path 312a is completely covered by the blue filter 314B during the read-out operation of the CCD 312. In response to the generation of the fourth position signal, the VCCD signal 340 and the HCCD signal 341 are successively generated in the same manner as described above. In synchronism with above signals, the image signal outputted from the CCD 312 is subjected to the same signal processings as described above in the image receiving circuit 321 and the A/D converter 325, and then is memorized in a memory area for the blue component in the memory 326. By those processes, a color image of one frame is memorized in the memory. The above processes are repeated with a fourth position signal being regarded as a first position signal to thereby continuously renew the image data in the memory 326.

The charges of the red, green and blue color images are integrated with respect to time in the photosensitive portion of the CCD 312 for the periods of (Rθ−Xθ)/γ, (Gθ−Xθ)/γ and (Bθ−Xθ)/γ (second), respectively, and the amount of the charges thus integrated is quantized in the A/D converter 325. The amount of the thus quantized charges for each color image corresponds to the image data of each of the red, green and blue components. The ratio of the charge integration times of the three color images is equal to that or reciprocals of the total sensitivity ratios of $\eta R$, $\eta G$ and $\eta B$ of the combination of the optical system and the CCD system. Therefore, when a complete while light, that is, the composite light obtained by mixing red, green and blue lights in the equal ratio of light intensity is incident on the photosensitive portion of the CCD 312, The amount of the charges stored in the CCDE 312 per unit time is proportional to $\eta R$, $\eta G$, and $\eta B$ for the red, green and blue color images, respectively, and the charges for each color image are integrated in the CCD 312 for the integration time of the color image which is equal to the reciprocal of the charge amount of the color image, so that the ratio of the data stored in the memory is 1:1:1 for the three color images. This means that other color tones are also accurately reproduced. Accordingly, unlike the conventional image input device, the image input device of this embodiment can perform its function without variable gain amplifier.

In the image input device of this embodiment, in a case of outputting an image data from the memory, the image data in the memory 333 is preserved and then is outputted from the memory at the time of the generation of a position signal subsequent to generation of arbitrary origin signal except for the initial origin signal. Further, in a case where a monochromatic image data is required, the respective color image data are added to obtain the monochromatic data.

As described above, according to this fourth embodiment, an image which has a high balance among the color components of the image can be read out for a short time without reducing the resolution. Further, the filter unit is not required to be intermittently rotated, so that vibration of the filter unit is reduced and the control of the device is easier.

While the present invention has been described with reference to specific embodiment, it should be apparent for those skilled in the art that a variety of changes and modification may be made without departing from the scope and spirit of the invention.

What is claimed is:

1. An image input device for inputting a light image of an object, comprising:
    filter means comprising at least two color filter elements for receiving the light image and separating the light image into color light components corresponding to the color filter elements;
    image pickup means having a photosensitive portion for separately receiving the color light components and converting the color light components to electrical signals, said filter means being movably disposed with respect to said image pickup means;
    filter position detecting means for detecting a position of each of the color filter elements and outputting a position signal representative of the position of each of the color filter elements;
    filter drive means for moving said filter means so that the color filter elements selectively receive the light image;
    comparison means for comparing the position signal with a reference signal and outputting a comparison signal; and
    control means responsive to the comparison signal for controlling the filter drive means so that the position signal and the reference signal are in synchronism with each other.

2. An image input device according to claim 1, wherein said filter means further comprises a light shielding element interposed between the color filter elements for interrupting the image pickup means from receiving the light image.

3. An image input device according to claim 1, wherein said filter means comprises a disk-shaped filter, said filter being angularly divided into at least two color filter segments.

4. An image input device according to claim 3, wherein the color filter segments have different sensitivities to light from one another, and each color filter segment has a filtering area corresponding to its sensitivity to light.

5. An image input device according to claim 1, further comprising a variable gain amplifier connected to said image pickup means for varying a gain of the electrical signal depending upon the filter element associated with the electrical signal.

6. An image input device for inputting a light image of an object, comprising:
    filter means comprising at least two color filter elements for receiving the light image and separating the light image into color light components corresponding to the color filter element;
    image pickup means having a photosensitive portion for separately receiving the color light components and converting the color light components to electrical signal including a first sync signal having a first phase, said filter means being movably disposed with respect to said image pickup means;
    filter position detecting means for detecting a position of each of the color filter elements and outputting a position signal representative of the position of each of the color filter elements, the position signal having a second phase corresponding to the movement of the filter means;
    filter drive means for moving said filter means so that the color filter elements selectively receive the light image;

comparison means for comparing the position signal with a reference signal and outputting a comparison signal;

sync signal generating means for generating a second sync signal;

receiving means for receiving the electrical signal in response to the second sync signal; and time adjusting means for controlling said sync signal generating means to adjust occurrence of the second sync signal in response to a difference between the first and second phase.

* * * * *